United States Patent [19]

Ishikawa et al.

[11] Patent Number: 4,962,455
[45] Date of Patent: Oct. 9, 1990

[54] ANTI-SKID BRAKE CONTROL SYSTEM WITH FEATURE OF PROJECTION OF VEHICLE BODY SPEED REPRESENTATIVE DATA WITH HIGH PRECISION

[75] Inventors: Yasuki Ishikawa, Tokyo; Yoshiki Yasuno, Kanagawa; Akira Higashimata, Kanagawa; Takeshi Fujishiro, Kanagawa, all of Japan

[73] Assignee: Nissan Motor Company Limited, Yokohama, Japan

[21] Appl. No.: 331,169

[22] Filed: Mar. 31, 1989

[30] Foreign Application Priority Data

Mar. 31, 1988 [JP] Japan ................................ 63-78566

[51] Int. Cl.$^5$ .............................................. B06T 8/32
[52] U.S. Cl. ................................ 364/426.02; 303/97; 303/107; 303/108
[58] Field of Search ............... 364/426.02, 565, 566; 303/97, 105–109; 180/197

[56] References Cited

U.S. PATENT DOCUMENTS

| 4,408,290 | 10/1983 | Kubo et al. | 364/566 |
|---|---|---|---|
| 4,569,560 | 2/1986 | Kubo | 303/116 |
| 4,598,052 | 6/1986 | Matsuda | 364/550 |
| 4,637,663 | 1/1987 | Matsuda | 303/106 |
| 4,656,588 | 4/1987 | Kubo | 364/426 |
| 4,660,146 | 4/1987 | Kubo | 364/426 |
| 4,662,686 | 5/1987 | Matsuda | 303/106 |
| 4,663,715 | 5/1987 | Kubo | 364/426 |
| 4,663,716 | 5/1987 | Kubo | 364/426 |
| 4,665,491 | 5/1987 | Kubo | 364/424 |
| 4,667,176 | 5/1987 | Matsuda | 340/52 F |
| 4,669,045 | 5/1987 | Kubo | 364/426 |
| 4,669,046 | 5/1987 | Kubo | 364/426 |
| 4,672,547 | 6/1987 | Masaki et al. | 364/426.02 |
| 4,674,049 | 6/1987 | Kubo | 364/426 |
| 4,674,050 | 6/1987 | Kubo | 364/426 |
| 4,679,146 | 7/1987 | Kubo | 364/426 |
| 4,680,713 | 7/1987 | Kubo | 364/426 |
| 4,680,714 | 7/1987 | Kubo | 364/426 |
| 4,682,295 | 7/1987 | Kubo | 364/426 |
| 4,683,537 | 7/1987 | Matsuda | 364/426 |
| 4,704,684 | 11/1987 | Kubo | 364/426 |
| 4,718,013 | 1/1988 | Kubo | 364/426 |
| 4,763,912 | 8/1988 | Matsuda | 180/197 |
| 4,771,850 | 9/1988 | Matsuda | 180/197 |
| 4,780,818 | 10/1988 | Kubo | 364/426.02 |
| 4,805,103 | 2/1989 | Matsuda | 364/426.02 |
| 4,809,182 | 2/1989 | Matsuda | 364/426.02 |
| 4,870,582 | 9/1989 | Hoashi et al. | 364/426.02 |
| 4,876,650 | 10/1989 | Kubo | 364/426.02 |

FOREIGN PATENT DOCUMENTS 5679043  11/1979  Japan .
5711149   6/1980  Japan .

*Primary Examiner*—Thomas G. Black
*Attorney, Agent, or Firm*—Foley & Lardner, Schwartz, Jeffery, Schwaab, Mack, Blumenthal & Evans

[57] ABSTRACT

An anti-skid brake control system two mutually different mode for projecting the vehicle body speed representative data. In the first mode, the vehicle body speed representative data is derived on the basis of an instantaneous wheel speed data which is latched upon initiation of vehicular braking operation or upon detection of vehicular braking deceleration, and an integrated value of a longitudinal acceleration indicative signal. On the other hand, in a second mode, the vehicle body speed representative data is derived on the basis of the initially latched instantaneous wheel speed data and a fixed value of wheel deceleration gradient data. A first vehicle body speed representative data derived through the first mode of operation and a second vehicle body speed representative data derived through the second mode of operation are selectively used as the vehicle body speed representative data.

12 Claims, 4 Drawing Sheets

ANTI-SKID BRAKE CONTROL SYSTEM WITH FEATURE OF PROJECTION OF VEHICLE BODY SPEED REPRESENTATIVE DATA WITH HIGH PRECISION

BACKGROUND OF THE INVENTION

1. Field of the Invention

The present invention relates generally to an anti-skid brake control system for an automotive vehicle for maintaining wheel slippage during vehicular braking state in the vicinity of a predetermined optimum level. More specifically, the invention relates to an anti-skid brake control system which can precisely derive a vehicle body representative data as one of the essential parameters for precisely performing anti-skid brake control.

2. Description of the Background Art

One of the typical conventional anti-skid brake control systems has been disclosed in Japanese Patent First (unexamined) Publication (Tokkai) Showa No. 57-11149. In the disclosed technologies, the anti-skid brake control system derives a vehicle body speed representative data on the basis of a longitudinal acceleration exerted on the vehicle body. In the practical operation for deriving the vehicle body speed representative data, a wheel speed upon initiation of vehicular braking operation is latched as an initial value of the vehicle body speed representative data. The longitudinal acceleration exerted on the vehicle body is monitored by a longitudinal acceleration sensor which produces a longitudinal acceleration indicative signal. The longitudinal acceleration indicative signal is integrated. The integrated value is subtracted from the initially latched wheel speed as the initial value of the vehicle body speed representative data in order to derive an instantaneous value of the vehicle body speed representative data.

On the other hand, Japanese Patent First (unexamined) Publication (Tokkai) Showa No. 56-79043 discloses another system of the anti-skid brake control system. The disclosed system detects high possibility of wheel locking. The system is responsive to the vehicular braking condition which can cause wheel locking to latch an instantaneous wheel speed as the initial value of the vehicle body speed representative data. For a given period from detection of possibility of wheel locking, a fixed value, e.g. −1.2 G, of a wheel deceleration gradient data. The wheel deceleration gradient data is integrated over the given period. The system subtracts the instantaneous integrated value from the initially locked wheel speed data for deriving the instantaneous vehicle body speed representative data.

In the former case, error contained in the longitudinal acceleration indicative signal due to secular variation which may cause variation of gain or drift of the longitudinal acceleration sensors per se. Influence of the error on the longitudinal acceleration indicative signal makes the signal value to represent the smaller magnitude of longitudinal acceleration than an actual value. In such case, the vehicle body speed representative data projected based on the integrated value of the error containing longitudinal acceleration indicative signal, tends to become higher than the actual vehicle body speed. Therefore, a wheel slippage derived based on such error containing projected vehicle body speed representative data can become greater than an actual value to cause decreasing of the braking pressure in a wheel cylinder at earlier timing than that actually required. This clearly degrade vehicular braking performance.

On the other hand, in the latter case, since the fixed value of the wheel deceleration gradient indicative value is set irrespective of the friction coefficient on the road surface. Therefore, braking performance can be significantly varied depending upon the friction level of the road surface. Furthermore, in case of four wheel-drive type vehicle, error between the projected vehicle body speed representative data and the actual vehicle body speed due to substantially great inertia.

SUMMARY OF THE INVENTION

Therefore, it is an object of the present invention to provide an anti-skid brake control system which employs a technologies for deriving a vehicle body speed representative data with high precision.

In order to accomplish aforementioned and other objects, an anti-skid brake control system, according to the present invention, has two mutually different modes for projecting the vehicle body speed representative data. In the first mode, the vehicle body speed representative data is derived on the basis of an instantaneous wheel speed data which is latched upon initiation of vehicular braking operation or upon detection of vehicular braking deceleration, and an integrated value of a longitudinal acceleration indicative signal. On the other hand, in a second mode, the vehicle body speed representative data is derived on the basis of the initially latched instantaneous wheel speed data and a fixed value of wheel deceleration gradient data. A first vehicle body speed representative data derived through the first mode of operation and a second vehicle body speed representative data derived through the second mode of operation are selectively used as the vehicle body speed representative data.

Practically, the first vehicle body speed representative data is used for performing anti-skid brake control for a predetermined period after initiation of the vehicular braking operation. After expiration of the predetermined period, the second vehicle body speed representative data is used for subsequent anti-skid brake control.

According to one aspect of the invention, an anti-skid brake control system for an automotive vehicle, comprises:
a braking circuit connecting a pressurized fluid source to a wheel cylinder for each of the front and rear wheels for building up braking pressure in the latter;
a pressure control valve means, disposed in the braking circuit, for controlling braking pressure in the wheel cylinder, the pressure control valve means operable for increasing braking pressure in the wheel cylinder in a first mode and decreasing braking pressure in the wheel cylinder in a second mode;
first sensor for monitoring rotation speed of associated one of the front and rear wheels for producing a wheel speed indicative signal;
second sensor for monitoring vehicular deceleration magnitude of a vehicle body for producing a deceleration magnitude indicative signal
third means for latching the wheel speed indicative signal value upon initiation of a skid control cycle and deriving a first vehicle body speed representative data on the basis of the latched wheel speed indicative signal value and an integrated value of the deceleration magnitude indicative signal;

fourth means for latching the wheel speed indicative signal value upon initiation of a skid control cycle and deriving a second vehicle body speed representative data on the basis of the latched wheel speed indicative signal value and an integrated value of a predetermined fixed deceleration gradient representative value;

fifth means for selectively outputting one of the first and second vehicle body speed representative data; and sixth means for producing a control signal for operating the pressure control valve means between the first and second mode positions according to a predetermined schedule on the basis of the wheel speed indicative signal value and the selected vehicle body speed representative data.

The anti-skid brake control system may further comprise seventh means for deriving a wheel acceleration data on the basis of the wheel speed indicative signal, the seventh means detecting initiation timing by comparing the wheel acceleration data with a predetermined wheel deceleration threshold and detecting the wheel acceleration decreasing across the wheel deceleration threshold. The fourth means may compare a vehicle body speed representative data derived on the basis of latched wheel speed indicative signal value and said integrated value, with an instantaneous wheel speed indicative signal value for selected greater one to output as the second vehicle body speed representative data.

The second sensor may comprise an acceleration sensor monitoring longitudinal acceleration exerted on the vehicle body for producing the wheel deceleration magnitude indicative signal having a value variable depending upon the monitored longitudinal acceleration.

The fifth means initially selecting the first vehicle body speed representative data in response to initiation of the skid cycle and switching selection from the first vehicle body speed representative data to the second vehicle body speed representative data after expiration of a predetermined period.

According to another aspect of the invention, an anti-skid brake control system for an automotive vehicle, comprises:

a braking circuit connecting a pressurized fluid source to a wheel cylinder for each of the front and rear wheels for building up braking pressure in the latter;

a first pressure control valve means, disposed in the braking circuit and associated with a first wheel cylinder associated with a first wheel, for controlling braking pressure in the first wheel cylinder, the first pressure control valve means operable for increasing braking pressure in the wheel cylinder in a first mode and decreasing braking pressure in the wheel cylinder in a second mode;

a second pressure control valve means, disposed in the braking circuit and associated with a second wheel cylinder associated with a second wheel, for controlling braking pressure in the second wheel cylinder, the second pressure control valve means operable for increasing braking pressure in the wheel cylinder in a first mode and decreasing braking pressure in the wheel cylinder in a second mode;

first sensor for monitoring rotation speed of the first wheel for producing a first wheel speed indicative signal;

second sensor for monitoring rotation speed of the second wheel for producing a second wheel speed indicative signal;

third sensor for monitoring vehicular deceleration magnitude of a vehicle body for producing a deceleration magnitude indicative signal;

fourth means for latching the first wheel speed indicative signal value upon initiation of a skid control cycle and deriving a first vehicle body speed representative data on the basis of the latched wheel speed indicative signal value and an integrated value of the deceleration magnitude indicative signal;

fifth means having a first channel for latching the first wheel speed indicative signal value upon initiation of a skid control cycle and deriving a first data value on the basis of the latched first wheel speed indicative signal value and an integrated value of a predetermined fixed deceleration gradient representative value, and a second channel for for latching the second wheel speed indicative signal value upon initiation of a skid control cycle and deriving a second data value on the basis of the latched second wheel speed indicative signal value and an integrated value of the predetermined fixed deceleration gradient representative value, the fourth means including means for selecting greater one of the first and second data value for outputting as a second vehicle body speed representative data;

sixth means for selectively outputting one of the first and second vehicle body speed representative data; and seventh means for producing first and second control signals for operating the first and second pressure control valve means between the first and second mode positions according to a predetermined schedule on the basis of the wheel speed indicative signal value and the selected vehicle body speed representative data.

BRIEF DESCRIPTION OF THE DRAWINGS

The present invention will be understood more fully from the detailed description given herebelow and from the accompanying drawings of the preferred embodiment of the invention, which, however, should not be limited to the specific embodiment of the invention; but are for explanation and understanding only.

In the drawings.

DESCRIPTION OF THE PREFERRED EMBODIMENT

Figure 1:
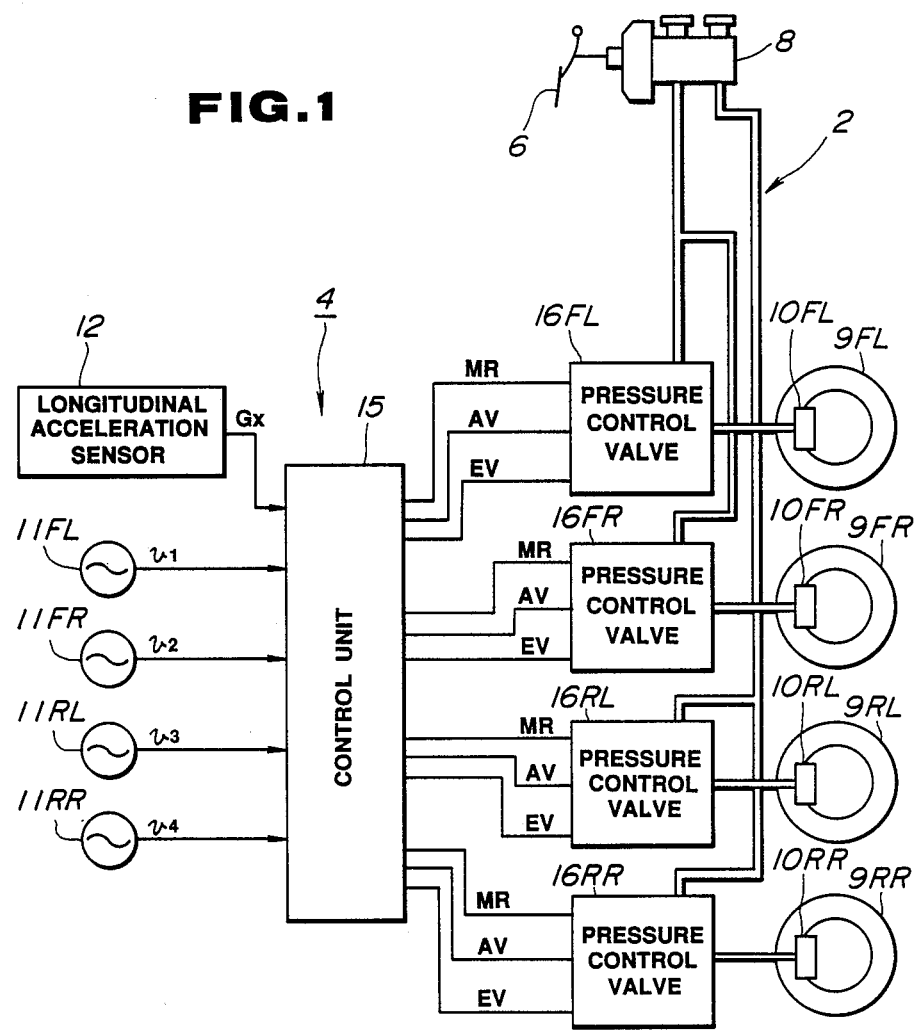
FIG. 1 is a block diagram of the preferred embodiment of an anti-skid brake control system according to the present invention, which includes a system for projection vehicle body speed representative data with high precision.

Referring now to the drawings, particularly to FIG. 1, the preferred embodiment of an anti-skid brake control system, according to the present invention, will be discussed with respect to application for a vehicle having a power train having four wheel-drive type power train layout.

A hydraulic brake system 2 includes a brake pedal 6, a master cylinder 8 mechanically connected to the brake pedal 6. The hydraulic brake system 2 is associated with wheel cylinders 10FL, 10FR, 10RL and 10RR respectively associated with front-left, front-right, rear-left and rear-right wheels 9FL, 9FR, 9RL and 9RR. The hydraulic brake system 2 also comprises pressure control valves 16FL, 16FR, 16RL and 16RR which are disposed between the master cylinder 8 and the wheels cylinders 10FL, 10FR, 10RL and 10RR for controlling braking pressure generated in the wheels cylinders.

The hydraulic brake system 2 is associated with an anti-skid brake control system 4. The anti-skid brake control system 4 comprises a control unit 15. The control unit 15 is connected to wheel speed sensors 11FL, 11FR, 11RL and 11RR to receive therefrom wheel speed indicative signals $v_1$, $v_2$, $v_3$ and $v_4$. Each of the wheel speed sensors 11FL, 11FR, 11RL and 11RR comprises an electromagnetic or optoelectric pick-up for monitoring rotation speed of the associated wheel. The wheel speed sensors 11FL, 11FR, 11RL and 11RR produce alternating current form wheel speed indicative signals $v_1$, $v_2$, $v_3$ and $v_4$. The alternating current form wheel speed indicative signals $v_1$, $v_2$, $v_3$ and $v_4$ respectively have frequencies proportional to the rotation speed of respectively associated wheels 9FL, 9FR, 9RL and 9RR. The control unit 15 is also connected to a longitudinal acceleration sensor 12 to receive therefrom a longitudinal acceleration indicative signal Gx. The longitudinal acceleration sensor 12 is mounted on an appropriate position on the vehicle body for monitoring the longitudinal acceleration exerted on the vehicle body to produce the longitudinal acceleration indicative signal Gx. The control unit 15 processes the wheel speed indicative signals $v_1$, $v_2$, $v_3$ and $v_4$ and the longitudinal acceleration indicative signal Gx to produce an anti-skid brake control signal. As seen from FIG. 1, the anti-skid brake control signal comprises an inlet control signal (EV signal), an outlet control signal (Av signal) and a fluid pump control signal (MR signal) as a combination for controlling operation mode of the pressure control valves 16FL, 16FR, 16RL and 16RR.

In general, the control unit performs anti-skid brake control through the following schedule. During the anti-skid control, the pressure control valve units 16FL, 16FR, 16RL and 16RR are controlled the operational modes independently to each other. Each of the pressure control valve units 16FL, 16FR, 16RL and 16RR is generally operated in the aforementioned three mode positions over skid control cycles. In general, skid control cycle is scheduled as follows:

(1) the pressure control valve unit 16 is maintained at the APPLICATION mode position upon initiation of the braking operation which is triggered by depression of the brake pedal 6, (2) by application of the braking force to the brake pedal, working fluid pressure is built up in the master cylinder 8, since the pressure control valve unit 16 is held at the APPLICATION mode position, the braking pressure in the wheel cylinder 10 is increased linearly in proportion to increasing of the working fluid pressure to decelerate the wheel speed, (3) by increasing of the braking pressure, wheel deceleration $-\alpha$ (negative value of wheel acceleration) increases and becomes greater than a predetermined deceleration threshold $-\alpha_{ref}$, the control unit 15 is responsive to the wheel deceleration increased across the deceleration threshold to initiate skid control cycle, upon which the skid control cycle enters into HOLD mode cycle period to place the pressure control valve unit 16 at the HOLD mode position to maintain the increased level of braking pressure constant;

(4) by holding the increase level of braking pressure in the HOLD mode position of the pressure control valve unit 16, wheel is decelerated to increase wheel slippage across a predetermined wheel slippage threshold, the control unit 22 is responsive to increasing of the wheel slippage increasing across the wheel slippage threshold to terminal the HOLD mode cycle period and trigger RELEASE mode cycle period, in which the pressure control valve unit 16 is placed in the RELEASE mode position to decrease braking pressure in the wheel cylinder 10;

(5) by maintaining the pressure control valve unit 16 in the RELEASE mode position, braking pressure is reduced and thus wheel is accelerated to result in increasing of wheel acceleration $+\alpha$ across a predetermined wheel acceleration threshold $+\alpha_{ref}$, the control unit 22 is responsive to increasing of the wheel acceleration $+\alpha$ across the wheel acceleration threshold $+\alpha_{ref}$ to terminate the RELEASE mode cycle period and trigger a HOLD mode cycle period to switch the position of the pressure control valve unit 16 from the RELEASE mode position to the HOLD mode position in order to hold the braking pressure at the lowered level;

(6) by maintaining the pressure control valve unit 16 at the HOLD mode, wheel speed is resumed and increased across the vehicle body speed and subsequently return to the speed corresponding to the vehicle body speed, the control unit 22 is responsive to the wheel speed once increased across the vehicle body speed and subsequently return to the vehicle body speed to terminate HOLD mode cycle period and trigger APPLICATION mode cycle period;

skid cycles (3) to (6) are repeated while anti-skid control is active.

Figure 2:
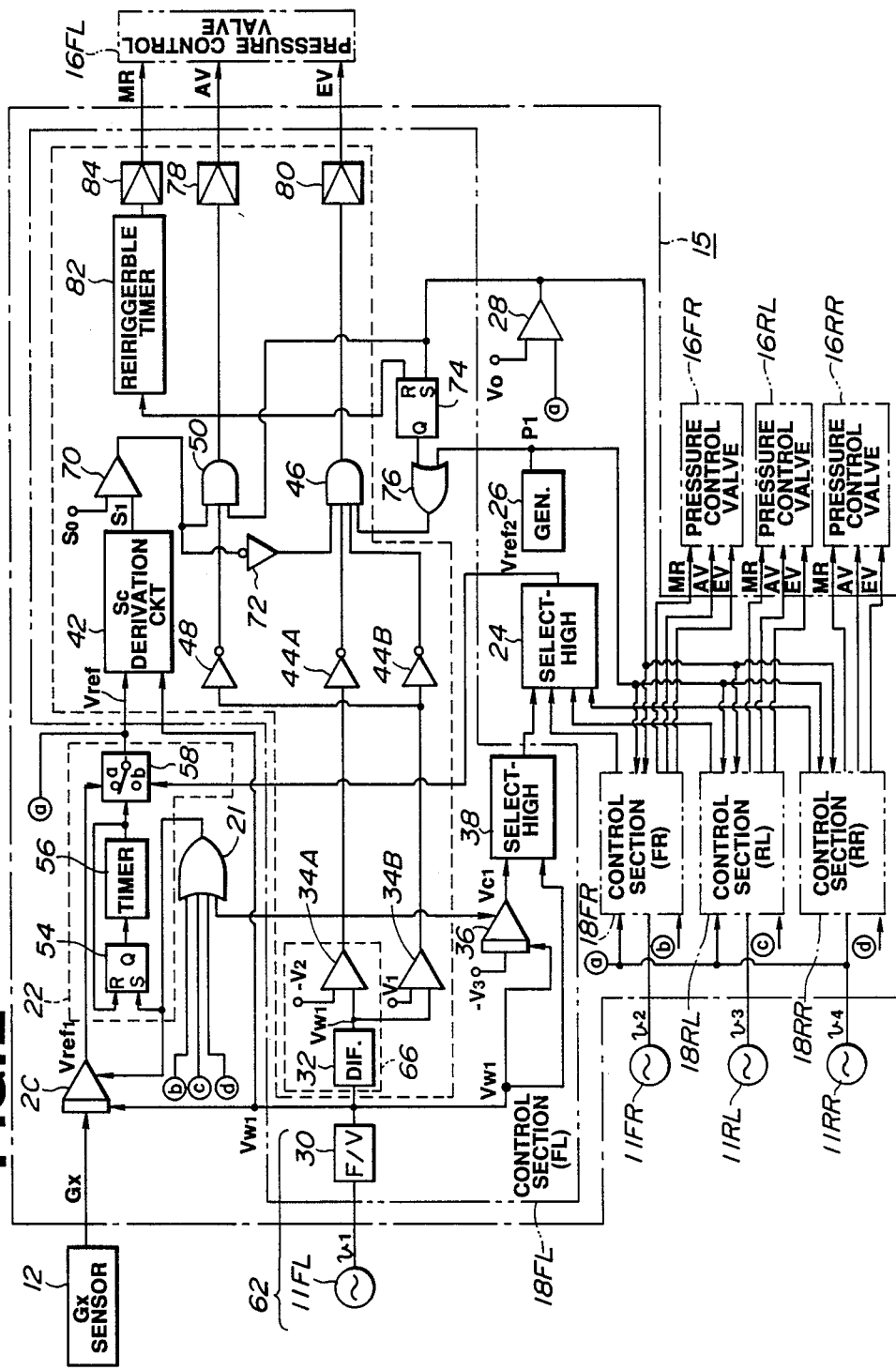
FIG. 2 is a block diagram of the detailed construction of a control unit employed in the preferred embodiment of the anti-skid brake control system of FIG. 1.

Detailed construction of the control unit 4 will be discussed herebelow with reference to FIG. 2. As set forth, the control unit 15 controls the pressure control valve units 16FL, 16FR, 16RL and 16RR independently of the others. In order to perform independent control for respective pressure control valves units 16FL, 16FR, 16RL and 16RR, the control unit 15 comprises independently operable control channels 18FL, 18FR, 18RL and 18RR. Since respective control channels 18FL, 18FR, 18RL and 18RR are of identical construction to each other, FIG. 2 illustrates only the control channel 18FL in detail. Therefore, the following discussion will be concentrated to the detailed construction and operation for the control channel 18FL. However, it should be appreciated that other control channels 18FR, 18RL and 18RR have the same circuit construction and operation to that will be given herebelow. In addition, the control unit 15 has a circuit common to the control channels 18FL, 18FR, 18RL and 18RR to provide a common vehicle body speed representative data $V_{ref1}$. The circuit for deriving the common vehicle body speed representative data $V_{ref1}$ will be hereafter referred to as "common vehicle body speed derivation circuit". The common vehicle body speed derivation circuit comprises an first vehicle body speed representative data derivation circuit 20, an OR gate 21, a selector switch circuit 22, a select-HIGH switch circuit 24, a pulse generator 26 and a comparator 28. Detailed circuit connection and function of the common vehicle body speed derivation circuit will be discussed later.

The control channel 18FL has an input stage including a flequency-to-voltage (F/V) conveter 30 connected to the wheel speed sensor 11FL. The F/v converter 30 converts the alternating current form frequency signal as the wheel speed indicative signal $v_1$ into a wheel speed indicative voltage signal $Vw_1$ having a signal level variable depending upon the wheel speed. The output terminal of the F/v converter 30 is connected to a differentiation circuit 32 which performs differentiation of the wheel speed indicative voltage signal $Vw_1$ for deriving a wheel acceleration data $\alpha$. The differentiation circuit 32 outputs a wheel acceleration indicative signal $\alpha$. The wheel acceleration indicative data indicative signal is fed to comparators 34A and 34B. The comparator 34A compares the wheel acceleration indicative signal $\alpha$ with a reference voltage $-V_2$ which is representative of a predetermined wheel deceleration threshold $-\alpha_2$. The voltage $-V_2$ will be hereafter referred to as "deceleration threshold representative reference voltage". The comparator 34A outputs comparator signal which is maintained LOW level as long as the wheel acceleration indicative signal level is higher than the wheel deceleration threshold representative reference voltage $-V_2$ and is switched into HIGH level when the wheel acceleration indicative signal level $\alpha$ lowers is maintained lower than or equal to the wheel deceleration threshold representative reference voltage $-V_2$. On the other hand, the comparator 34B compares the wheel acceleration indicative signal level $\alpha$ with a reference voltage $V_1$ representative of a wheel acceleration threshold $\alpha_1$. The reference voltage $V_1$ will be hereafter referred to as "wheel acceleration threshold representative reference voltage". The output of the comparator 34B is maintained at LOW level as long as the wheel acceleration indicative signal level is $\alpha$ is maintained lower than the wheel acceleration threshold representative reference voltage $V_1$ and is maintained HIGH level while the wheel acceleration indicative signal level $\alpha$ is held higher than or equal to the wheel acceleration threshold representative reference voltage $V_1$.

The output terminals of the comparators 34A and 34B are connected to an AND gate 46 via inverters 44A and 44B. On the other hand, the output terminal of the comparator 34B is also connected to an AND gate 50 via an inverter 48. The output terminal of the comparator 34A is connected to an OR gate 21. The OR gate 21 has input terminals connected to comparators 34A of respective control channels 18FR, 18RL and 18RR. The OR gate 21 is responsive to HIGH level comparator signal from any one of the control channels 18FL, 18FR, 18RL and 18RR to output HIGH level gate signal to a set input terminal of a flip-flop 54 in the selector switch circuit 22. The HIGH level gate signal of the OR gate 21 is also fed to the first vehicle body speed representative data derivation circuit 20 to trigger the latter. The first vehicle body speed representative data derivation circuit 20 is responsive to the HIGH level gate signal from the OR gate 21 to clear the integrated value and to latch the wheel speed indicative voltage signal value $Vw_1$ of the differentiation circuit 32 of the front-left control channel 18FL in response to the leading edge of the HIGH level signal and restart integrating operation to integrate the longitudinal acceleration indicative signal value Gx over an elapsed time. The first vehicle body speed representative data derivation circuit 20 thus derives an instantaneous first vehicle body speed representative data $V_{ref1}$ by subtracting the integrated value of the longitudinal acceleration from the latched initial value. In practice, the arithmetic operation performed in the first vehicle body speed representative data derivation circuit 20 can be illustrated by the following equation:

$$V_{ref1} = Vw_1 - \int Gxdt \qquad (1)$$

On the other hand, while the gate signal of the OR gate 21 is maintained at LOW level, the first vehicle body speed representative data derivation circuit 20 is cyclically or periodically reset to output the wheel speed indicative voltage signal value $Vw_1$ as the first vehicle body speed representative data $V_{ref1}$.

The output of the first vehicle body speed representative data derivation circuit 20 is provided on one terminal of a selector switch 58 in the selector switch circuit 22. The selector switch 58 is controlled the switch position by an input from a timer 56. The timer 56 is connected to the output terminal (Q terminal) of the flip-flop 54 so as to output HIGH level timer signal for a given period, e.g. 2 seconds, in response to the leading edge of the HIGH level input from the flip-flop 54 via the Q terminal. The selector switch 58 is responsive to HIGH level timer signal to output the first vehicle body speed representative data $v_{ref1}$. On the other hand, the selector switch 58 outputs a second vehicle speed representative data $V_{ref2}$, for which circuit construction end operation for deriving will be discussed later.

The front-left control channel 18FL further includes a vehicle body speed representative data derivation circuit 36 which includes an integrator. The vehicle body speed representative data derivation circuit 36 is connected to the comparator 34A and is controlled the operation by the level of the comparator signal. Similarly to the first vehicle body speed representative data derivation circuit 20, the vehicle body speed representative data derivation circuit 36 cyclically or periodically reset the integrated value to output the wheel speed indicative voltage signal $Vw_1$ as the vehicle body speed representative data $V_{c1}$, as long as the comparator signal of the comparator 34A is maintained LOW level. On the other hand, the vehicle body speed representative data derivation circuit 36 is responsive to the HIGH level comparator signal to integrate a preset fixed value of wheel deceleration gradient representative voltage $-V_3$ over a time. Also, the vehicle body speed representative data derivation circuit 36 latches the instantaneous wheel speed indicative voltage signal $Vw_1$ as initial value of the vehicle body speed representative data $V_{c1}$ in response to the leading edge of the HIGH level comparator signal from the comparator 34A to start integration of the wheel deceleration gradient representative voltage $-V_3$ to derive the vehicle body speed representative data $V_{c1}$ according to the following equation:

$$V_{c1} = V_{w1} - \int V_3 dt \qquad (2)$$

The vehicle body speed representative data derivation circuit 36 has an output terminal connected to a select-HIGH circuit 38. The select-HIGH circuit 38 is also connected to the F/v converter 30 to receive therefrom the wheel speed indicative voltage signal $V_{w1}$ and receives the vehicle body speed representative data $V_{c1}$ of the vehicle body speed representative data derivation circuit 36. The select-HIGH circuit 38 compares the input wheel speed voltage signal value $V_{w1}$ and the vehicle speed representative data $V_{c1}$ to select greater one to output as a select-HIGH output. The select-HIGH outputs of respective of front-left, front-right, rear-left and rear-right control channels 18FL, 18FR, 18RL and 18RR are connected to another select-HIGH circuit 24. The select-HIGH circuit 24 selects one of the greatest value of the select-HIGH outputs $V_{c1}$ from respective control channels to output the select-HIGH output which serves as the second vehicle body speed representative data $V_{ref2}$. Therefore, the vehicle body speed representative data derivation circuit 36 and the select-HIGH circuits 38 and 24 will serve as the second vehicle body speed representative data derivation circuit in combination.

The output terminal of the selector switch 58 is connected to a wheel slippage (Si) derivation circuit 42. The wheel slippage derivation circuit 42 receives the vehicle body speed representative data $V_{ref}$ which is selected one of the first and second vehicle body speed representative data $V_{ref1}$ and $V_{ref2}$, and the wheel speed indicative voltage signal $V_{w1}$. The wheel slippage derivation circuit 42 derives the wheel slippage indicative data Si according to the following equation:

$$Si = ((V_{ref} - V_{w1})/V_{ref}) \times 100 \ (\%) \qquad (3)$$

The wheel slippage derivation circuit 42 is connected to a comparator 70 to input the wheel slippage indicative data Si. The comparator 70 also receives a wheel slippage threshold S0 representative reference signal. The comparator 70 compares the wheel slippage indicative data Si and the reference signal S0 to output HIGH level comparator signal when the wheel slippage indicative data Si is greater than or equal to the reference signal value $S_0$ and otherwise output the LOW level comparator signal. The output terminal of the comparator 70 is connected to the AND gate 50 and connected to the AND gate 46 via an inverter 72.

On the other hand, the vehicle body speed representative data $V_{ref}$ output from the selector switch 58 is also fed to one input terminal of the comparator 28. The comparator 28 compares the received vehicle body speed representative data $V_{ref}$ with a substantially low vehicle speed representative reference voltage V0. In the shown embodiment, the substantially low vehicle speed representative voltage V0 is set to represent a vehicle speed almost stopping of the vehicle, e.g. lower than or equal to 5 km/h. The comparator 28 outputs HIGH level comparator signal when the vehicle body speed representative data $V_{ref}$ is greater than or equal to the low vehicle speed representative reference voltage V0 and otherwise output LOW level comparator signal.

The output terminal of the comparator 28 is connected to a set input terminal of a flip-flop 74. The flip-flop 74 has a reset input terminal connected to AND gate 50. The output terminal of the flip-flop 74 is connected to an OR gate 76 which has another input terminal connected to a pulse generator 26 which outputs periodic pulse having a predetermined pulse width.

The AND gate 46 is connected to an amplifier 80 which is connected to an inlet control (EV) valve of the pressure control valve 16FL. On the other hand, the AND gate 50 is connected to an amplifier 78 is connected to an outlet control (AV) valve of the pressure control valve 16FL. The AND gate 50 is also connected to a retriggerable timer 82 which is, in turn, connected to an amplifier 84. The amplifier 84 is connected to a fluid pump in the pressure control valve. The amplifier 80 is outputs an inlet control signal for controlling the EV valve, which inlet control signal will be hereafter referred to as "EV signal". The amplifier 78 outputs an outlet control signal for controlling the AV valve, which outlet control signal will be hereafter referred to as "AV signal". The retriggerable timer 82 is triggered by HIGH level gate signal of the OR gate 50 to output HIGH level timer signal for a predetermined trigger period which is set at a period longer than a possible longest period of skid control cycle. The amplifier 84 outputs a fluid pump control signal to control the fluid pump in the pressure control valve 16FL, which fluid pump control signal will be hereafter referred to as "MR signal".

Figure 3:
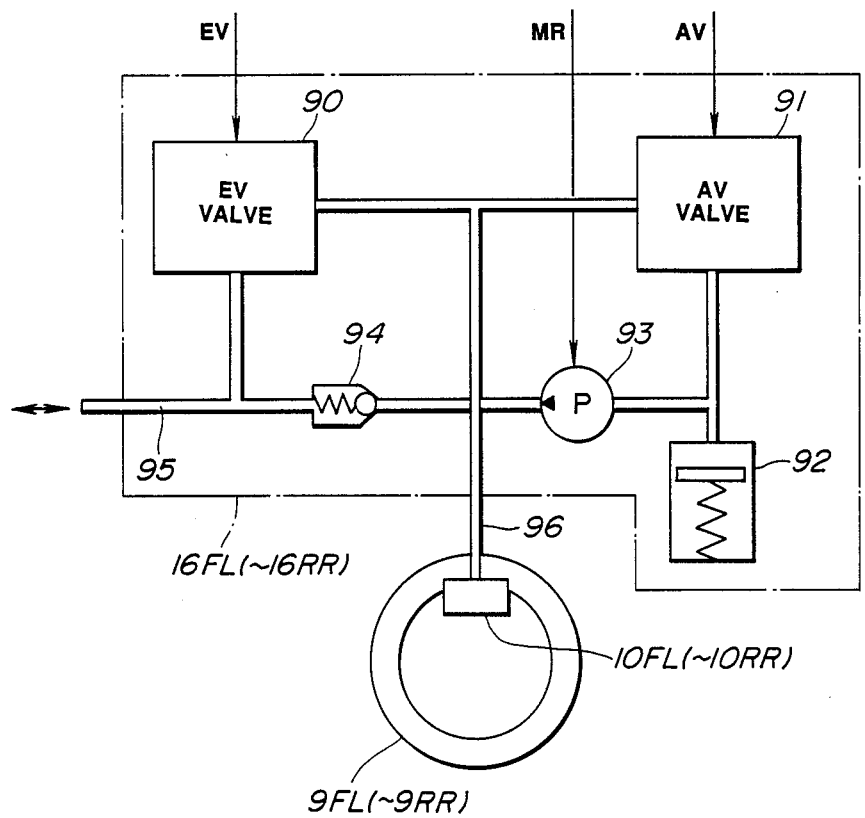
FIG. 3 is a block diagram of the preferred construction of a pressure control valve unit employed in the preferred embodiment of the anti-skid brake control system of FIG. 1.

FIG. 3 shows the detailed construction of the pressure control valve 16FL, 16FR, 16RL and 16RR. In the following discussion, the detailed construction of the pressure control valve will be represented by the reference numeral "16".

As shown in FIG. 3, the pressure control valve unit 16 which reference numeral commonly represents the pressure control valve units 16FL, 16FR, 16RL and 16RR, comprises an inlet control valve 90 which will be hereafter referred to as "EV valve", an outlet control valve 91, which will be hereafter referred to as "AV signal" and a drain pump 93 and a pressure accumulator 92. The pressure control valve 16 has an inlet port 95 connected to the master cylinder 8 to receive the working fluid pressure built up in the latter and an outlet port 96 connected the wheel cylinder 10 which reference numeral generally represents the wheel cylinders 10FL, 10FR, 10RL and 10RR. The EV valve 90 is interposed between the inlet port 95 and the outlet port 96 for controlling introduction of the pressurized working fluid to the wheel cylinder 10. The Av valve 91 is connected to the outlet of the EV valve 90, the outlet port 96 at the inlet side and to the pressure accumulator 92 and the drain pump 93. The discharge outlet drain pump 93 is connected to the inlet port 95 via a one-way check valve 94 for returning part of working fluid in the pressure control valve unit 16 to the fluid reservoir (not shown) and designed for supplying pressurized working fluid.

With the construction set forth above, the pressure control valve unit 22 essentially operates in three mutually different operational modes. Name, the pressure control valve unit 22 operates in an APPLICATION mode for increasing braking pressure in the wheel cylinder 10, a RELEASE mode for decreasing braking pressure in the wheel cylinder, and a HOLD mode to maintain the braking pressure constant. In the APPLICATION mode position, the EV valve 90 is maintained in open position to establish fluid communication between the master cylinder 8 and the wheel cylinder 10 and the AV valve 91 is maintained closed position for blocking fluid communication between the wheel cylinder 10 and the pressure accumulator 92. At the same time, the drain pump 93 may be held inoperative state.

In the RELEASE mode position of the pressure control valve unit 16, the EV valve 90 is held closed to block fluid communication between the inlet port to the outlet port and whereby blocking pressure supply from the master cylinder 8 to the wheel cylinder 10. At the same time, the AV valve 91 is maintained at open position to establish fluid communication between the outlet port 96, and the pressure accumulator 92 and the drain pump 93 so that the pressurized fluid in the wheel cylinder 10 can be drained to the pressure accumulator 92 or to the fluid reservoir via the drain pump 93 and the one-way check valve 94. In order to drain part of the working fluid from the wheel cylinder to the fluid reservoir, the drain pump 93 is driven in this RELEASE mode. On the other hand, in the HOLD mode position, both of the EV valve 90 and the AV valve 91 are held closed for completely disconnecting the wheel cylinder 10 from the inlet port 95 and the pressure accumulator 92.

The EV valve 90 is held open position in response to LOW level EV signal and shifted to closed position in response to the HIGH level EV signal. On the other hand, the AV valve 91 is maintained at closed position as long as the AV signal is held LOW level and is opened by the HIGH level AV signal. The drain pump 93 is driven by the HIGH level MR signal.

Figure 4:
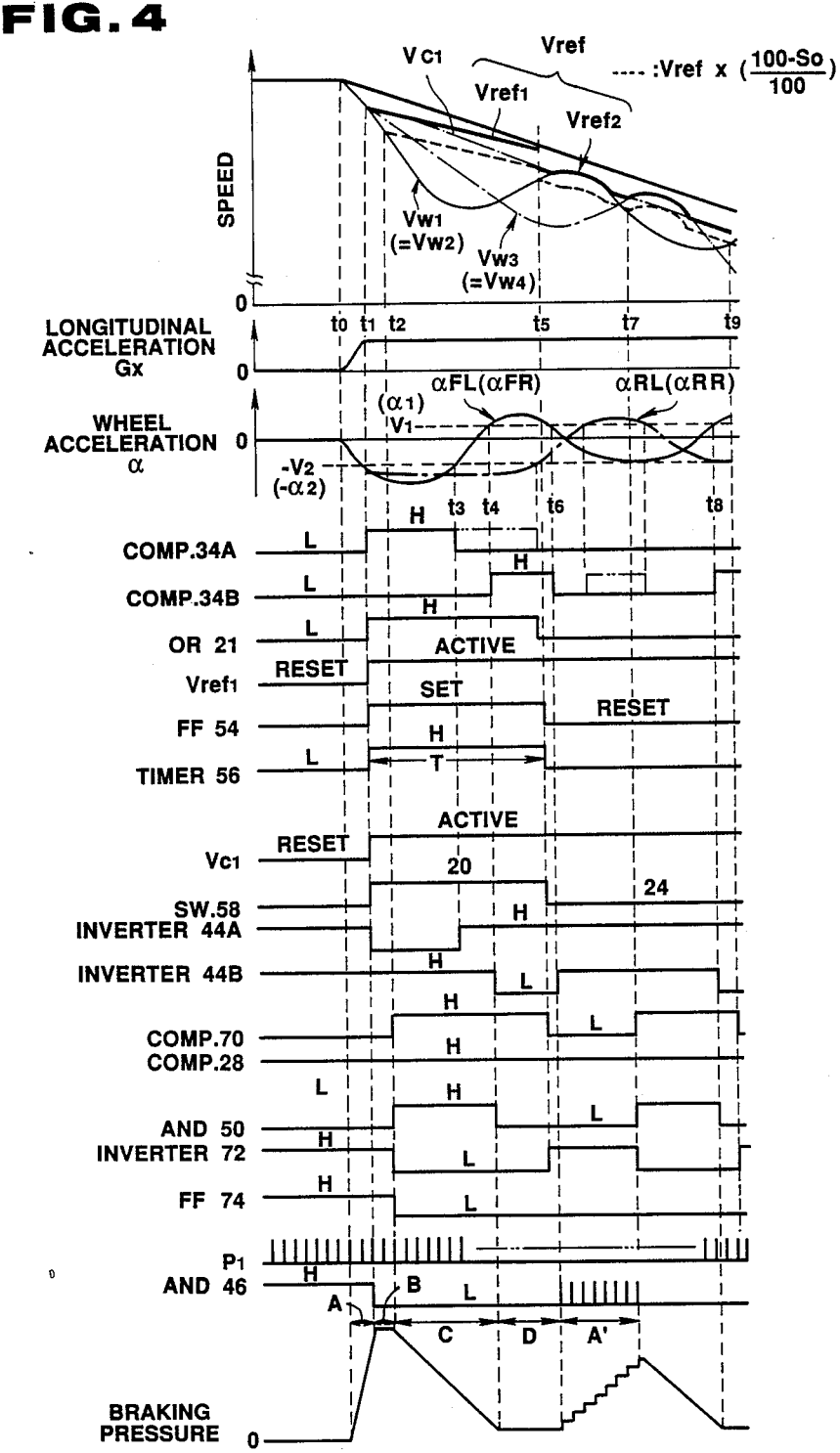
FIG. 4 is a timing chart showing operation of the preferred embodiment of the anti-skid brake control system, which shows waveforms of various components in the circuit of FIG. 2.

FIG. 4 shows timing chart of operation performed in the preferred embodiment of the anti-skid brake control system according to the present invention. As set forth, the wheel speed sensors 11FL, 11FR, 11RL and 11RR monitors wheel speed of respective associated wheels 9FL, 9FR, 9RL and 9RR to produce wheel speed indicative alternating current form frequency signals $v_1$, $v_2$, $v_3$ and $v_4$. The control unit receives these frequency signals $v_1$, $v_2$, $v_3$ and $v_4$ with the longitudinal acceleration indicative signal Gx generated by the longitudinal acceleration sensor 12 and processes the input signals for monitoring vehicular driving condition.

The process of signal processing performed in the control unit 15 will be discussed herebelow in terms of the signal processing operation performed in the control channel 18FL for the front-left wheel 9FL. As set forth, the F/v converter 30 converts the frequency signal $v_1$ to produce the wheel speed indicative voltage signal $Vw_1$. The wheel speed indicative voltage signal $Vw_1$ is differentiated by the differentiation circuit 32 to derive the wheel acceleration indicative data $\alpha_{FL}$. The wheel acceleration indicative data $\alpha_{FL}$ is compared with the wheel acceleration threshold $+\alpha_1$ and the wheel deceleration threshold $-\alpha_2$. While brake is not applied, the wheel acceleration $\alpha_{FL}$ is maintained smaller than the wheel acceleration threshold $+\alpha_1$ and greater than the wheel deceleration threshold $-\alpha_2$. Therefore, the output levels of the comparators 34A and 34B are held LOW level. Since the wheel acceleration $\alpha_{FR}$, $\alpha_{RL}$ and $\alpha_{RR}$ of the front-right, rear-left and rear-right control channels 18FR, 18RL and 18RR are also maintained greater than the wheel deceleration threshold $-\alpha_2$, the gate signal of the OR gate 21 is maintained LOW level. By the LOW level gate signal of the OR gate 21, the integrated value of the first vehicle body speed representative data derivation circuit 20 is continuously or periodically reset so that the first vehicle body speed representative data derivation circuit output the first vehicle body speed representative data $V_{ref1}$ having a value corresponding to the instantaneous wheel speed indicative voltage signal value $Vw_1$. At the same time, the flip-flop 54 is maintained at reset state and thus the timer signal of the timer 56 is maintained at LOW level. At this time, the selector switch 58 is held in a position to connect the select-HIGH circuit 24 to the wheel slippage derivation circuit 42. Therefore, the select-HIGH output as the second vehicle body speed representative data $V_{ref2}$ of the select-HIGH circuit 24 is used for deriving the wheel slippage Si in the wheel slippage derivation circuit 42. Since the no braking pressure is generated in the wheel cylinder 10FL, the wheel slippage Si is maintained at a value substantially zero. Therefore, the wheel slippage Si as compared with the wheel slippage threshold $S_0$ is maintained to be smaller than the latter. Therefore, the output level of the comparator 70 is maintained LOW level. At this time, since the all of the comparator signals of the comparators 34A, 34B and 70 are maintained LOW level, the inputs to the AND gate 46 via the inverters 44A, 44B and 72 are maintained HIGH level. At the same time, as long as the vehicle travels at a speed higher than the low vehicle speed representative reference voltage $V_0$, the output of the comparator 28 is maintained at HIGH level to establish AND condition in the AND gate 46. Therefore, the amplifier 80 outputs HIGH level EV control signal to open the Ev valve 90. At the same time, since direct input from the comparator 70 is maintained LOW level, the AND condition in the AND gate 50 is not established. Therefore, the gate signal of the AND gate 50 is maintained LOW level. This causes LOW level AV signal to shut-off the AV valve 91 in the closed position. Because the gate signal of the AND gate 50 is maintained at LOW level, the retriggerable timer 82 is held inoperative to maintain the MR signal at LOW level. Therefore, the fluid pump 93 is maintained at inoperative condition.

As will be appreciated herefrom, while the brake is not applied and vehicle travels at a speed higher than the low vehicle speed criterion represented by the low vehicle speed representative reference voltage $V_0$, the operational mode of the pressure control valve unit 28FL is maintained at APPLICATION mode. Therefore, when vehicular brake is applied at a time $t_0$, the fluid pressure is built up in the master cylinder 8. Accordingly, the braking pressure in the wheel cylinder 10FL increases in substantially proportional to increasing of the fluid pressure in the master cylinder.

By this, the vehicle is abruptly decelerated. Therefore, the negative longitudinal acceleration (deceleration) is exerted on the vehicle body. This causes the longitudinal acceleration sensor to output the longitudinal acceleration indicative signal Gx having a value corresponding to the longitudinal acceleration monitored. At the same time, according to increasing of the braking pressure in the wheel cylinder 10FL, the wheel acceleration $\alpha_{FL}$ decreases.

At a time $t_1$, the wheel acceleration indicative data $\alpha_{FL}$ decreases across the wheel deceleration threshold $-\alpha_2$. Therefore, the comparator signal level of the comparator 34A turns into HIGH level at the time $t_1$. By the HIGH level comparator signal of the comparator 34A, the AND condition in the AND gate 46 is destroyed due to LOW level input from the inverter 44A. Therefore, the EV control signal output from the amplifier 80 turns into LOW level to close the Ev valve. Thus, operational mode of the pressure control valve unit 16FL switched into HOLD mode.

At the same time, by the HIGH level comparator signal of the comparator 34A, the gate signal of the OR gate 21 turns into HIGH level to to latch the instantaneous wheel speed indicative voltage signal value $Vw_1$ as the initial value of the first vehicle body speed representative data $V_{ref1}$ and trigger integration of the longitudinal acceleration indicative signal Gx in the first vehicle body speed representative data derivation circuit 20. The first vehicle body speed representative data derivation circuit as triggered, derives the first vehicle body speed representative data $V_{ref1}$ by subtracting the integrated value from the latched initial first vehicle body speed representative data. Simultaneously, the HIGH level comparator signal of the comparator 34A is fed to the vehicle body speed representative data derivation circuit 36 to cause latching of the instantaneous wheel speed indicative voltage signal value $Vw_1$ as the initial value of the vehicle body speed representative data $V_{c1}$ and trigger integrating operation for integrating the fixed value of wheel deceleration gradient indicative voltage $-V_3$.

The flip-flop 54 is responsive to the HIGH level gate signal input to the set input terminal to be set to output HIGH level output. The timer 56 is thus triggered by the leading edge of the HIGH level output of the flip-flop to output HIGH level timer signal for a given period of time. In response to the HIGH level timer signal, the selector switch 58 turns the switch position to establish connection between the first vehicle body speed representative data derivation circuit 20 and the wheel slippage derivation circuit 42 so as to feed the first vehicle body speed representative data $V_{ref1}$ to the latter.

By maintaining the pressure control valve unit 16FL at the HOLD mode for the period starting from the time $t_1$, the braking pressure is maintained constant at the increased level. Therefore, wheel is further decelerated to increase the wheel slippage Si which is derived on the basis of the first vehicle body speed representative data $V_{ref1}$ until the predetermined period set for the timer 56 expires.

At a time $t_2$, the wheel slippage Si increases across the wheel slippage threshold $S_0$. In response to this, the comparator signal level of the comparator 70 is switched into HIGH level. As long as the vehicle body speed representative data $V_{ref}$ output from the selector switch 58 is maintained at the low vehicle speed representative reference voltage $V_0$, AND condition of the AND gate 50 is established by switching of the comparator signal level of the comparator 70 into HIGH level. Therefore, the gate signal output from the AND gate 50 turns into HIGH level to cause HIGH level Av control signal. This causes opening of the Av valve 91. At this time, since the gate signal of the AND gate 46 is maintained at LOW level, the EV lave 90 is maintained at closed position. Therefore, the operational mode of the pressure control valve unit 16FL is switched into RELEASE mode. By placing the pressure control valve at the RELEASE mode position, the braking pressure in the wheel cylinder 10FL is decreased.

At the same time, in response to the HIGH level gate signal of the AND gate 50, the retriggerable timer 82 is triggered to output the HIGH level timer signal for a predetermined period. Therefore, the MR signal turns into HIGH level to start driving of the fluid pump 93. As set forth, since the preset timer of the retriggerable timer 82 is set at a period longer than a possible longest skid cycle, the fluid pump 93 is continued to be driven for overall skid control period over a plurality of skid control cycles.

At the same time, the HIGH level gate signal of the AND gate 50 is supplied to the flip-flop 74 to reset the latter. Therefore, after the time $t_2$, the input level from the flip-flop 74 to the OR gate 76 turns into LOW level. Decreasing of the braking pressure in the wheel cylinder 10FL, wheel speed is gradually recovered toward the vehicle speed. While the operational mode of the pressure control valve unit 16FL is maintained at the RELEASE mode, the wheel acceleration $\alpha_{FL}$ increases across the wheel deceleration threshold $-\alpha_2$ at a time $t_3$. This causes switching of the comparator signal level of the comparator 34A into LOW level. However, at this time, since the LOW level signal is supplied from the inverter 72 by the presence of the HIGH level comparator signal of the comparator 70. Therefore, the gate signal of the AND gate 46 is maintained at LOW level to maintain the EV valve 90 at the closed position. The wheel acceleration $\alpha_{FL}$ further increases during RELEASE mode operation of the pressure control valve unit 16FL and increase across the wheel acceleration threshold $+\alpha_1$ at a time $t_4$. Then, the comparator signal of the comparator 34B turns into HIGH level to destroy the AND condition of the AND gate 50 by the LOW level input through the inverter 48. Therefore, the Av valve 91 is switched into the closed position. This causes switching of the operational mode of the pressure control valve unit 16FL into the HOLD mode.

By maintaining the braking pressure in the wheel cylinder 10FL constant at the decreased level, the wheel speed is gradually increased. During this HOLD mode operation of the pressure control valve unit 16FL, the set period of the timer 56 expires at a time $t_5$. In response to this the selector switch position is switched to establish connection between the select-HIGH circuit 24 to the wheel slippage derivation circuit 42. As set forth, the select-HIGH circuit 24 has four inputs connected to the select-HIGH circuits 38 in respective of front-left, front-right, rear-left and rear-right control channels 18FL, 18FR, 18RL and 18RR. On the other hand, the select-HIGH circuit 38 in each of the control channels receives the wheel speed indicative voltage signal $Vw_1$, $Vw_2$, $Vw_3$ or $Vw_4$ from the associated differentiation circuit 32 and the vehicle body speed representative data $V_{c1}$ from the vehicle speed representative data derivation circuit 36. The select-HIGH circuit 38 selects greater one of the wheel speed indicative signal $Vw_n$ and the vehicle body speed representative data $V_{c1}$ to output select-HIGH signal. The select-HIGH circuit 24 selects the greatest one of the select-HIGH signals from respective control channels 18FL, 18FR, 18RL and 18RR to output the select-HIGH output as the second vehicle body speed representative data $V_{ref2}$. Therefore, at this time, the second vehicle body speed representative data $V_{ref2}$ is output from the selector switch 58 as the vehicle body speed representative data $V_{ref}$.

In the shown example, upon switching the selector switch position at the time $t_5$, the wheel speed $Vw_1$ increases across a target wheel speed which represents the wheel slippage threshold $S_0$ derived in relation to the vehicle body speed representative data $V_{ref}$ corresponding to the second vehicle body speed representative data $V_{ref2}$. In response to increasing of the wheel speed $Vw_1$ across the target wheel speed, the comparator signal level of the comparator 70 is switched into LOW level. Despite the HIGH level input from the inverter 72, the gate signal of the AND gate 46 is maintained LOW level due to presence of the LOW level input from the inverter 44B. Therefore, operational mode of the pressure control valve unit 16FL is still maintained at the HOLD mode.

During maintaining the HOLD mode of the pressure control valve unit 16FL, the wheel acceleration $\alpha_{FL}$ reaches a peak and then start to decrease. At a time $t_6$, the wheel acceleration $\alpha_{FL}$ decreases across the wheel acceleration threshold $+\alpha_1$. In response to this, the comparator signal level of the comparator 34B turns into LOW level to establish AND condition in the AND gate 46. Therefore, HIGH level EV control signal is supplied to the EV valve 90 to open. At this time, by the LOW level input from the comparator 70, the AND gate 50 is maintained at LOW level. Therefore, the AV control signal is maintained at LOW level to hold the AV valve 91 at the closed position. Therefore, the operational mode of the pressure control valve unit 16FL is maintained at the APPLICATION mode position.

In the second and subsequent skid control cycle, the output of the flip-flop 74 to the OR gate 76 is maintained at LOW level. Therefore, the input level from the OR gate 76 to the AND gate 46 periodically altered depending upon the periodic pulse signal generated by the pulse generator 26. Therefore, in the second and subsequent skid control cycle, gate signal level of the AND gate 46 is switched between HIGH and LOW level at a frequency and period defined by the periodic pulse of the pulse generator 26. Therefore, the Ev valve 90 is periodically switched between open and closed positions for alternating operational mode of the pressure control valve unit 16FL between APPLICATION mode position and HOLD mode position so as to increase the braking pressure in stepwise fashion as shown in FIG. 4. Such mode of increasing the braking pressure in stepwise fashion will be hereafter referred to as "CONTROLLED APPLICATION mode".

As seen from FIG. 4, the CONTROLLED APPLICATION mode is maintained in a period from the time $t_6$ to a time $t_7$. Subsequent to the CONTROLLED APPLICATION mode, the operational mode of the pressure control valve unit 16FL is switched into RELEASE mode as shown in the period between the time $t_7$ to a time $t_8$.

Figure 5:
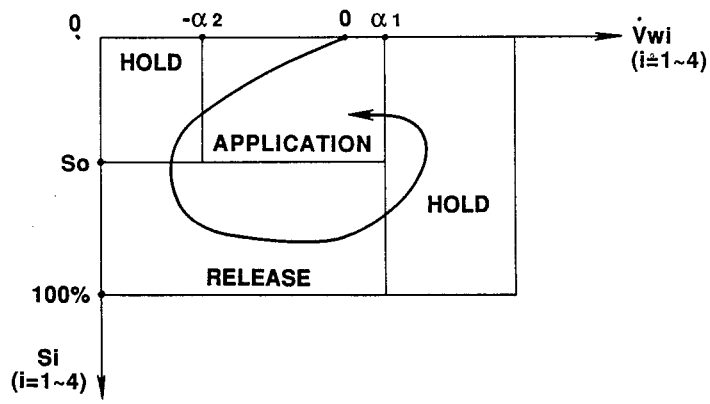
FIG. 5 is an illustration showing schedule of selecting of operation modes in each skid control cycle.

Therefore, we will be appreciated herefrom, by repeating the skid cycles according to the schedule shown in FIG. 5, the vehicle can be steadily deceleration without causing excessive wheel slippage. In the process set out above, since the vehicle body speed representative data can be derived with satisfactorily high precision level, precise anti-skid brake control can be performed.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the specific technologies have been disclosed hereinbefore in terms of the preferred embodiment of the present invention, the technologies disclosed in the following United States patents, all owned by the common assignee to the present invention.

U.S. Pat. No. 4,408,290, issued on Oct. 4, 1983
U.S. Pat. No. 4,674,049, issued on June 16, 1987
U.S. Pat. No. 4,704,684, issued on Nov. 3, 1987
U.S. Pat. No. 4,663,715, issued on May 5, 1987
U.S. Pat. No. 4,663,716, issued on May 5, 1987
U.S. Pat. No. 4,660,146, issued on Apr. 21, 1987
U.S. Pat. No. 4,665,491, issued on May 12, 1987
U.S. Pat. No. 4,780,818, issued on Oct. 25, 1988
U.S. Pat. No. 4,674,050, issued on June 16, 1987
U.S. Pat. No. 4,680,714, issued on July 14, 1987
U.S. Pat. No. 4,682,295, issued on July 21, 1987
U.S. Pat. No. 4,680,713, issued on July 145, 1987
U.S. Pat. No. 4,669,046, issued on May 26, 1987
U.S. Pat. No. 4,669,045, issued on May 26, 1987
U.S. Pat. No. 4,679,146, issued on July 7, 1987
U.S. Pat. No. 4,656,588, issued on Apr. 7, 1987
U.S. Pat. No. 4,718,013, issued on Jan. 5, 1988
U.S. Pat. No. 4,569,560, issued on Feb. 11, 1986
U.S. Pat. No. 4,662,686, issued on May 5, 1987
U.S. Pat. No. 4,667,176, issued on May 19, 1987
U.S. Pat. No. 4,597,052, issued on June 24, 1986
U.S. Pat. No. 4,637,663, issued on Jan. 20, 1987
U.S. Pat. No. 4,683,537, issued on July 28, 1987
U.S. Pat. No. 4,809,182, issued on Feb. 28, 1989
U.S. Pat. No. 4,805,103, issued on Feb. 14, 1989 will be applicable for implementing the present invention. Furthermore, the technology herewith disclosed may be applicable not only for anti-skid brake control system but also for traction control technologies utilizing technologies close to the anti-skid brake control. For example, the traction control technologies have been disclosed in the following United States patents which are also owned by the common owner of the present invention:

U.S. Pat. No. 4,763,912, issued on Aug. 16, 1988
U.S. Pat. No. 4,771,850, issued on Sept. 20, 1988

The disclosure of the above-identified United States Patents will be herein incorporated by reference for the sake of disclosure.

What is claimed is:

1. An anti-skid brake control system for an automotive vehicle, comprising:
   a braking circuit connecting a pressurized fluid source to a wheel cylinder for each of front and rear wheels for building up braking pressure;
   a pressure control valve means, disposed in said braking circuit, for controlling braking pressure in said wheel cylinder, said pressure control valve means operable for increasing braking pressure in said wheel cylinder in a first mode and decreasing braking pressure in said wheel cylinder in a second mode;
   first sensor for monitoring rotation speed of associated one of the front and rear wheels for producing a wheel speed indicative signal;
   second sensor for monitoring vehicular deceleration magnitude of a vehicle body for producing a deceleration magnitude indicative signal;
   third means for latching said wheel speed indicative signal upon initiation of a skid control cycle and deriving a first vehicle body speed representative data on the basis of said latched wheel speed indicative signal value and an integrated value of said deceleration magnitude indicative signal;

fourth means for latching said wheel speed indicative signal upon initiation of a skid control cycle and deriving a second vehicle body speed representative data on the basis of said latched wheel speed indicative signal and an integrated value of a predetermined fixed deceleration gradient representative value;

fifth means for selectively outputting one of said first and second vehicle body speed representative data; and sixth means for producing a control signal for operating said pressure control valve means between said first and second mode positions according to a predetermined schedule on the basis of said wheel speed indicative signal and said selected vehicle body speed representative data.

2. An anti-skid brake control system as set forth in claim 1, which further comprises seventh means for deriving a wheel acceleration data on the basis of said wheel speed indicative signal, said seventh means detecting initiation timing by comparing said wheel acceleration data with a predetermined wheel deceleration threshold and detecting the wheel acceleration decreasing across said wheel deceleration threshold.

3. An anti-skid brake control system as set forth in claim 2, wherein said fourth means compares a vehicle body speed representative data derived on the basis of latched wheel speed indicative signal and said integrated value, with an instantaneous wheel speed indicative signal for selected greater one to output as said second vehicle body speed representative data.

4. An anti-skid brake control system as set forth in claim 2, wherein said fifth means initially selects said first vehicle body speed representative data in response to initiation of said skid cycle and switches selection from said first vehicle body speed representative data to said second vehicle body speed representative data after expiration of a predetermined period.

5. An anti-skid brake control system as set forth in claim 1, wherein said fifth means initially selects said first vehicle body speed representative data in response to initiation of said skid cycle and switches selection from said first vehicle body speed representative data to said second vehicle body speed representative data after expiration of a predetermined period.

6. An anti-skid brake control system as set forth in claim 1, wherein said second sensor comprises an acceleration sensor monitoring longitudinal acceleration exerted on the vehicle body for producing said wheel deceleration magnitude indicative signal having a value variable depending upon the monitored longitudinal acceleration.

7. An anti-skid brake control system for an automotive vehicle, comprising:

a braking circuit connecting a pressurized fluid source to a wheel cylinder for each of front and rear wheels for building up braking pressure in the latter;

a first pressure control valve means, disposed in said braking circuit and associated with a first wheel cylinder associated with a first wheel, for controlling braking pressure in said first wheel cylinder, said first pressure control valve means operable for increasing braking pressure in said wheel cylinder in a first mode and decreasing braking pressure in said wheel cylinder in a second mode;

a second pressure control valve means, disposed in said braking circuit and associated with a second wheel cylinder associated with a second wheel, for controlling braking pressure in said second wheel cylinder, said second pressure control valve means operable for increasing braking pressure in said wheel cylinder in a first mode and decreasing braking pressure in said wheel cylinder in a second mode;

first sensor for monitoring rotation speed of said first wheel for producing a first wheel speed indicative signal;

second sensor for monitoring rotation speed of said second wheel for producing a second wheel speed indicative signal;

third sensor for monitoring vehicular deceleration magnitude of a vehicle body for producing a deceleration magnitude indicative signal;

fourth means for latching said first wheel speed indicative signal upon initiation of a skid control cycle and deriving a first vehicle body speed representative data on the basis of said latched wheel speed indicative signal and an integrated value of said deceleration magnitude indicative signal;

fifth means having a first channel for latching said first wheel speed indicative signal upon initiation of a skid control cycle and deriving a first data value on the basis of said latched first wheel speed indicative signal and an integrated value of a predetermined fixed deceleration gradient representative, and a second channel for for latching said second wheel speed indicative signal upon initiation of a skid control cycle and deriving a second data value on the basis of said latched second wheel speed indicative signal and an integrated value of said predetermined fixed deceleration gradient representative value, said fourth means including means for selecting greater one of said first and second data value for outputting as a second vehicle body speed representative data;

sixth means for selectively outputting one of said first and second vehicle body speed representative data; and seventh means for producing first and second control signals for operating said first and second pressure control valve means between said first and second mode positions according to a predetermined schedule on the basis of said wheel speed indicative signal and said selected vehicle body speed representative data.

8. An anti-skid brake control system as set forth in claim 7, which further comprises eighth means for deriving a wheel acceleration data on the basis of said wheel speed indicative signal, said eighth means detecting initiation timing by comparing said wheel acceleration data with a predetermined wheel deceleration threshold and detecting the wheel acceleration decreasing across said wheel deceleration threshold.

9. An anti-skid brake control system as set forth in claim 8, wherein each channel of said fifth means compares a vehicle body speed representative data derived on the basis of latched wheel speed indicative signal and said integrated value, with an instantaneous wheel speed indicative signal value for selected greater one to output as said second vehicle body speed representative data.

10. An anti-skid brake control system as set forth in claim 8, wherein said sixth means initially selects said first vehicle body speed representative data in response to initiation of said skid cycle and switches selection from said first vehicle body speed representative data to said second vehicle body speed representative data after expiration of a predetermined period.

11. An anti-skid brake control system as set forth in claim 7, wherein said sixth means initially selects said first vehicle body speed representative data in response to initiation of said skid cycle and switches selection from said first vehicle body speed representative data to said second vehicle body speed representative data after expiration of a predetermined period.

12. An anti-skid brake control system as set forth in claim 7, wherein said third sensor comprises an acceleration sensor monitoring longitudinal acceleration exerted on the vehicle body for producing said wheel deceleration magnitude indicative signal having a value variable depending upon the monitored longitudinal acceleration.

* * * * *